(12) United States Patent
Bohn et al.

(10) Patent No.: US 6,726,244 B2
(45) Date of Patent: Apr. 27, 2004

(54) APPARATUS AND METHOD FOR FOLDING AN AIRBAG AS WELL AS A FOLDED AIRBAG

(75) Inventors: Stefan Bohn, Goldbach (DE); Joachim Fellhauer, Nilkheim (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 11 days.

(21) Appl. No.: 09/974,959

(22) Filed: Oct. 11, 2001

(65) Prior Publication Data

US 2002/0043793 A1 Apr. 18, 2002

(30) Foreign Application Priority Data

Oct. 12, 2000 (DE) .......................................... 100 50 570

(51) Int. Cl.⁷ .......................... B60R 21/16; B65B 63/04; B31B 1/26
(52) U.S. Cl. ................. 280/743.1; 493/449; 493/457; 53/429
(58) Field of Search ................. 280/728.1, 743.1, 280/728.2; 493/449, 457, 405, 243, 256; 53/429, 117, 118

(56) References Cited

U.S. PATENT DOCUMENTS

| | | | |
|---|---|---|---|
| 5,795,284 A | | 8/1998 | Berti |
| 5,800,328 A | | 9/1998 | Berti |
| 6,086,089 A | * | 7/2000 | Aich et al. ................ 280/728.1 |
| 6,115,998 A | * | 9/2000 | Reh et al. ..................... 53/429 |
| 6,250,676 B1 | * | 6/2001 | Werstat et al. ........... 280/743.1 |
| 6,341,800 B1 | * | 1/2002 | Pausch ..................... 280/743.1 |
| 6,532,716 B1 | * | 3/2003 | Weis ............................ 53/258 |
| 2001/0036892 A1 | * | 11/2001 | Kleeberger et al. ......... 493/405 |

FOREIGN PATENT DOCUMENTS

| | | |
|---|---|---|
| DE | 19535564 A1 | 3/1997 |
| DE | 19702147 A1 | 4/1998 |
| DE | 19700433 A1 | 7/1998 |
| DE | 19716964 A1 | 10/1998 |
| DE | 19845721 | 4/2000 |
| DE | 19901472 | 7/2000 |
| DE | 10020677 A1 | 10/2001 |
| EP | 0712760 | 5/1996 |
| GB | 2342322 | 4/2000 |

* cited by examiner

*Primary Examiner*—Paul N. Dickson
*Assistant Examiner*—David R. Dunn
(74) *Attorney, Agent, or Firm*—Tarolli, Sundheim, Covell & Tummino L.L.P.

(57) ABSTRACT

An apparatus for folding an airbag for a vehicle occupant restraint system comprises a base for the airbag to be folded, a cover for the airbag, and a flexible element that is arranged between the base and the cover and has first and second ends. The first end of the flexible element is held between the base and the cover. The apparatus further comprises a traction means that acts upon the second end of the flexible element, and a pressure generating means with which the airbag can be acted upon with compressed gas. The invention further relates to a method of folding an airbag and making use of such an apparatus. Still further, the invention relates to a folded airbag produced by such a method.

5 Claims, 1 Drawing Sheet

APPARATUS AND METHOD FOR FOLDING AN AIRBAG AS WELL AS A FOLDED AIRBAG

TECHNICAL FIELD

The invention relates to an apparatus for folding an airbag for a vehicle occupant restraint system, to a method of folding such an airbag as well as to a folded airbag.

BACKGROUND OF THE INVENTION

Airbags that can be changed from a folded state into an unfolded state through the activation of a gas generator have meanwhile become a common feature of vehicle occupant restraint systems. An important requirement that such an airbag restraint system must fulfill is that the airbag has to be able to unfold completely within a very short period of time. The unfolding method is essentially determined by the manner in which the airbag was previously folded.

In the past, airbags were generally pleated in an accordion-like manner, for example, using folding blades. However, it was found that the relatively large folds created in this manner hinder the unfolding of the airbag. Nowadays, airbags are often not folded precisely, but rather simply pushed together, resulting in a chaotic folding pattern. The term "chaotic" means that the actual position of the various wall parts of the airbag cannot be predicted and will differ from one airbag to the next. In comparison to conventional methods that use folding blades, such a chaotic folding or pushing together method offers the advantage that it calls for less work for the folding and it results in better unfolding.

The object of the invention is to provide an apparatus as well as a method of folding an airbag in chaotic manner, with apparatus as well as method involving less effort for the folding.

This is achieved in an apparatus which comprises a base for the airbag to be folded, a cover for the airbag, and a flexible element that is arranged between the base and the cover and has first and second ends. The first end of the flexible element is held between the base and the cover. The apparatus further comprises a traction means that acts upon the second end of the flexible element, and a pressure generating means with which the airbag can be acted upon with compressed gas. The flexible element is arranged in such a way that it loops around the airbag which is disposed between the base and the cover. By pulling on the second end of the flexible element, the latter is pulled together, forming a loop that gets tighter and tighter. As a result, the airbag is pushed together from the outside towards the inside until it reaches the desired, completely folded state. In comparison to other apparatus that work with pushing elements or blades, this results in an especially simple structure, since no complicated movements are needed to fold the airbag; a simple pulling motion on the second end of the flexible element is sufficient.

Preferably, the base and the cover are arranged so as to have a defined distance from each other, the flexible element being a metal strip having a width which corresponds to this distance between the base and the cover. This forms a space that is completely enclosed by the metal strip, the base and the cover, and from which the airbag cannot escape when it is being folded. The metal strip is preferably a spring steel strip that, after being pulled together, recovers its original, expanded form once the second end is released.

According to the preferred embodiment of the invention, it is provided that the first end of the flexible element is firmly attached between the base and the cover. This facilitates both the mounting of the first end of the flexible element and the guidance of the flexible element in the area in which the flexible element is pulled out of the apparatus after it has encircled the airbag. After all, this is where the gap has to be as narrow as possible, so as to prevent the airbag from getting caught in the gap that is present between the flexible element forming the loop and the first end of the flexible element.

When the first end of the flexible element is affixed in the manner described, the entire airbag, except for the area that is immediately adjacent to the first end of the flexible element, is moved towards this first end while the airbag is being folded. For this reason, it is preferable for the base to be provided with a receptacle for a holding plate of the airbag and for the receptacle to be designed in the nature of a sliding guide. This ensures that the airbag, in spite of shifting when it is being pushed together, assumes a folded form in which its wall is arranged approximately symmetrically around the airbag's inflation opening, which is normally located in the area of the holding plate.

According to an alternative embodiment, it can also be provided that the first end of the flexible element is disposed between the base and the cover in such a way that it can be translatorily shifted. With this configuration, the center of the airbag—that is to say, for example, the inflation opening that is provided with the holding plate—remains stationary while all of the wall parts are moved symmetrically from the outside to the inside towards the inflation opening.

An adjusting cylinder, for instance, can be used to pull the flexible element out of the area between the base and the cover. Such an adjusting cylinder is a component of simple structure, with which the loop encircling the airbag can be pulled together easily, e.g. in a displacement-controlled or force-controlled manner. When the loop formed by the flexible element is pulled together in a displacement-controlled manner, the pushing procedure is only terminated once the airbag has been pushed together to a predefined circumference. When the airbag is pushed together in a force-controlled manner, the pulling together of the loop is completed as soon as the wall of the airbag offers a predefined resistance against being pushed together any further.

According to the preferred embodiment of the invention, the pressure generating means is configured as a fan. This makes it possible to pressurize the inside of the airbag in a simple manner so that the airbag unfolds between the base and the cover as well as the flexible element. In this manner, the airbag can be rendered into a partially folded state in which its height corresponds, for example, to the height of a receptacle provided to receive the airbag. In other words, the airbag is unfolded by the pressure generating means so as to have a shape in which the airbag has only a fraction of the height in comparison to the completely unfolded state.

In a preferred arrangement, the flexible element is provided with a large number of small openings and the pressure generating means is in flow connection with an outside surface of the flexible element. In this manner, an air cushion can be generated between the wall of the airbag and the flexible element. The air cushion reduces the friction between the wall of the airbag and the flexible element so that the flexible element entrains the walls not so much in the circumferential direction but rather acts upon them predominantly from the outside towards the inside.

In order to achieve the above-mentioned objective, a method of folding an airbag is also provided that comprises the following steps: first of all, the airbag is spread out on the base within an area that is encircled by the flexible element. Then the cover is placed onto the flexible element. Subsequently, the airbag is acted upon with pressure. As a result, it unfolds between the base, the cover and the flexible element. Then the flexible element is pulled together by pulling at its second end, as a result of which the airbag is pushed together. As far as the advantages of this method are concerned, reference is made to the explanations above.

An airbag that is folded together by the apparatus according to the invention and by the method according to the invention is distinguished in that its wall has a large number of chaotically arranged individual folding lines, several main folding lines being present that run in a slightly spiral shape around a center. The individual folding lines result from the essentially radial pushing together of the airbag from the outside towards the inside. The main folding lines that run in a spiral shape result from the friction between the flexible element and the walls of the airbag; the individual contact sites between the flexible element and the wall of the airbag execute a spiral-shaped motion when the loop formed around the airbag by the flexible element is pulled together.

Advantageous embodiments of the invention will be apparent from the subordinate claims.

DETAILED DESCRIPTION OF THE PREFERRED EMBODIMENT

Figure 1:
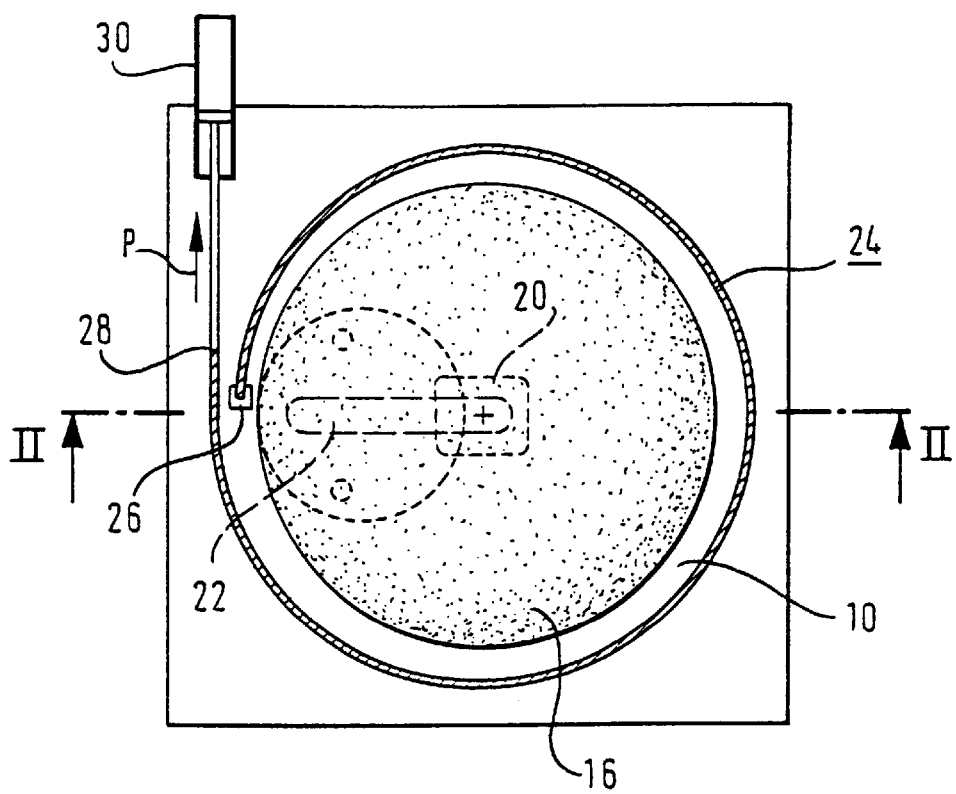
FIG. 1 is a top view of an apparatus according to the invention in a schematic section along the plane I—I of FIG. 2.

The apparatus for folding an airbag has a base 10, a lid 12 as well as a side wall 14. On the base 10, there is arranged an airbag 16 that is provided with a holding plate 18 in the area of its inflation opening. The holding plate 18 is installed on a carriage 20 that is arranged in a sliding guide 22 in the base 10.

Perpendicular to the base 10, there is arranged a flexible element 24 that is configured as a spring steel strip here. The spring steel strip 24 has a first end 26 that is affixed in a stationary position. The second end 28 of the spring steel strip is connected to a traction means 30 that is designed here as an adjusting cylinder. The spring steel strip 24, as can be seen in FIG. 1, is arranged in a circle or loop around the airbag 16, the circular shape being obtained in that the spring steel strip 24, after it has fully encircled the airbag, is guided past the first end 26 and close to same.

On the spring steel strip 24, a cover 32 is arranged in such a way that a space is formed which is enclosed by the base 10, the spring steel strip 24 and the cover 32 and in which the airbag 16 is located. The cover 32 is held in the lid 12 by a threaded connection as a result of which its distance from the base 10 can be set in such a way that there is only a narrow gap between the spring steel strip 24 and the base or the lid. This prevents the airbag from being able to escape from the space between the spring steel strip, the cover 32 and the base 10.

The apparatus is also provided with a pressure generating means 34 that is configured as a fan here. The fan is flow-connected with the inflation opening of the airbag in the area of the holding plate 18, so that the inside of the airbag can be filled with compressed gas and the airbag can unfold between the base 10, the spring steel strip 24 and the cover 32. The fan 34 is also connected to the space between the side wall 14 and the spring steel strip 24.

The spring steel strip 24 is provided with several small openings 36 the function of which will be explained below.

Figure 2:
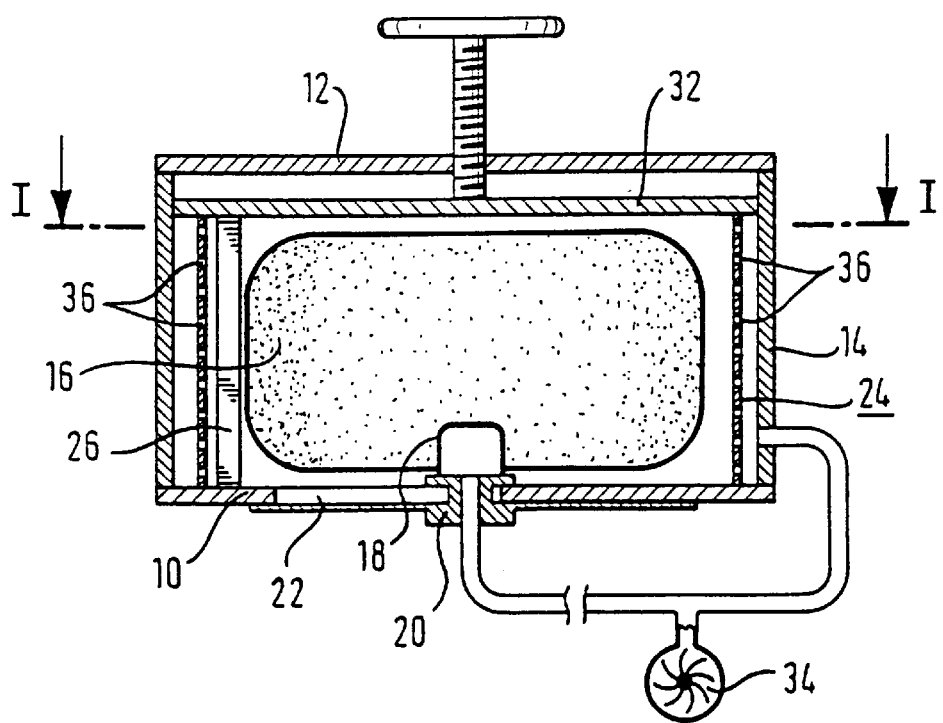
FIG. 2 is a side view of the apparatus according to FIG. 1 in a schematic section along the plane II—II of FIG. 1.

With the lid 12 and the cover 32 removed, the folded airbag is placed into the space encircled by the spring steel strip 24, the airbag holding plate 18 being connected to the carriage 20. Then the cover 32 is mounted together with the lid 12, and the distance from the cover to the base is set in the desired manner. Then the airbag is pressurized by the fan 34 so that it unfolds between the cover 32 and the base 10 in the very flattened shape shown in FIG. 2. The very flattened shape is distinguished in that the height of the airbag in this state is much smaller than the height that it would assume in case of free, complete unfolding.

By means of the fan 34, the space between the side wall 14 and the spring steel strip 24 is also pressurized, so that, due to the openings 36, an air cushion is formed between the outside of the wall of the airbag 16 and the spring steel strip 24. Then, by pulling the second end 28 of the spring steel strip in the direction of the arrow P in FIG. 1, the loop formed around the airbag can be pulled together so that the airbag is pushed together radially more and more, until it has finally assumed the shape shown by the dotted line in FIG. 1. When the airbag is being pushed together, the holding plate 18 automatically moves together with the carriage 20 to the left with regard to FIG. 1, since the inflation opening constitutes approximately the middle of the airbag at every stage of the folding procedure.

Due to the friction between the walls of the airbag and the spring steel strip 24 being low, the airbag is essentially pushed together radially and not so much rotated in the circumferential direction. The gap between the first, affixed end 26 of the spring steel strip 24 and the area of the spring steel strip that is being pulled past this end is kept as small as possible in order to prevent the airbag from slipping into this gap.

After the airbag has been completely pushed together, negative pressure can be applied to the inside of the airbag, for example, by reversing the fan 34, so that the airbag is secured in its pushed together form and can be placed, for example, into a receptacle or can be surrounded by a banderole.

What is claimed is:

1. A method of folding an airbag, said airbag comprising an inflation opening and at least one wall defining an inflation chamber, said airbag being folded by means of an apparatus comprising a base for said airbag to be folded, a cover for said airbag, a flexible element that is arranged between said base and said cover and has first and second ends, said first end of said flexible element being held between said base and said cover, a traction means that acts upon said second end of said flexible element, and a pressure generating means with which said airbag can be acted upon with compressed gas, said method comprising the following steps:
said airbag is spread out on said base within an area that is encircled by said flexible element,
said cover is placed onto said flexible element,
said airbag is acted upon with pressure,
said flexible element is pulled together by pulling at its second end, as a result of which said airbag is pushed together, wherein said first end of said flexible element is translatorily shifted toward said inflation opening while said second end of said flexible element is being pulled.

2. The method according to claim 1, wherein a negative pressure is applied to said airbag after it has been pushed together.

3. The method according to claim 1, wherein said flexible element is pulled together in a force-controlled manner wherein the resistance of the airbag as the airbag is pushed together against the flexible element determines the amount of force needed to pull together a loop of the flexible element.

4. The method according to claim 1, wherein said flexible element is pulled together in a displacement-controlled manner wherein the amount a loop of the flexible element is pulled together is determined by a predefined circumference of the airbag when pushed together by said flexible element.

5. A method of folding an airbag by means of an apparatus comprising a base for said airbag to be folded, a cover for said airbag, a flexible element that is arranged between said base and said cover and has first and second ends, said first end of said flexible element being held between said base and said cover, a traction means that acts upon said second end of said flexible element, and a pressure generating means with which said airbag can be acted upon with compressed gas, said method comprising the following steps:
- said airbag is spread out on said base within an area that is encircled by said flexible element,
- said cover is placed onto said flexible element,
- said airbag is acted upon with pressure,
- said flexible element is pulled together by pulling at its second end and said first end of said flexible element is affixed in a stationary position as a result of which said airbag is pushed together.

* * * * *